April 1, 1930.    F. J. WHITE    1,752,320
APPARATUS FOR REDUCING SHEATH CURRENTS
Filed April 8, 1927
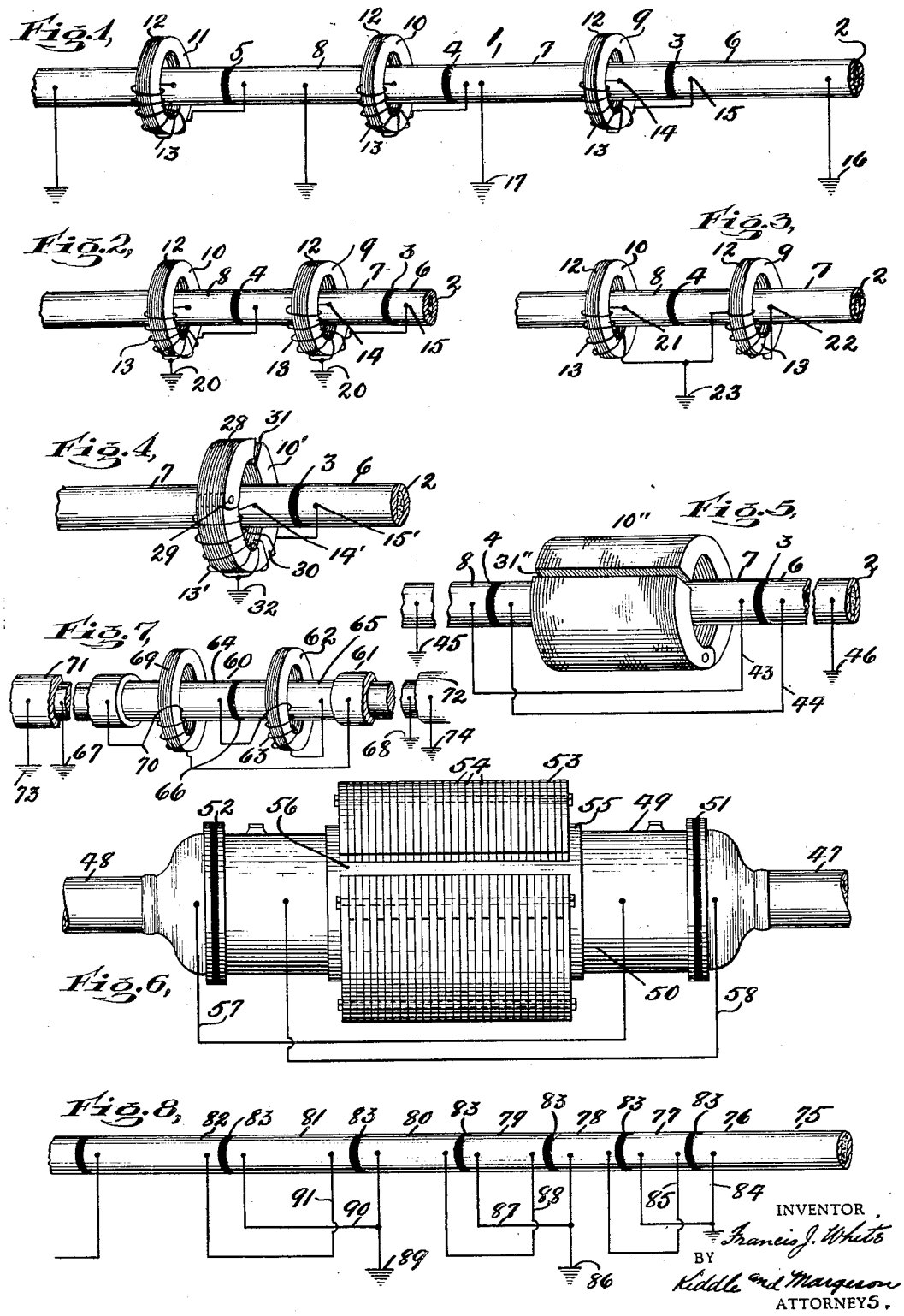
INVENTOR
Francis J. White
BY
Kiddle and Margeson
ATTORNEYS.

Patented Apr. 1, 1930

1,752,320

UNITED STATES PATENT OFFICE

FRANCIS J. WHITE, OF BROOKLYN, NEW YORK, ASSIGNOR TO THE OKONITE COMPANY, OF PASSAIC, NEW JERSEY, A CORPORATION OF NEW JERSEY

APPARATUS FOR REDUCING SHEATH CURRENTS

Application filed April 8, 1927. Serial No. 181,916.

This invention relates to electric apparatus, and particularly to apparatus for use in connection with cables for carrying alternating or pulsating currents, and has for one of its objects the provision of a method and apparatus for reducing the currents induced in the sheath or other cover or covering therefor, and referred to hereinafter as sheath currents.

It is well known that the passage of alternating current through a single conductor cable, or the unbalancing of alternating currents in a multiple conductor cable, induces an electromotive force in the cable sheath or metallic cover which, if this sheath or metallic cover is not connected to ground or to other conducting paths, may produce a dangerous difference of potential between this cable sheath and adjacent structures, and it is a further object of my invention to reduce or, if desired, to neutralize this action.

If this sheath is metallically connected with other conducting paths, so as to form a complete circuit, a current is set up. This so-called sheath current, in addition to the losses in transmission it causes, has an appreciable effect on the heating of the cable, and hence reduces the permissible current in the conductor. In order that these sheath currents may be reduced and at the same time to permit of grounding or bonding of the cable, I propose to place cores of magnetizable material provided with properly designed coils in proximity to the cable, so as to be magnetized by the current or currents flowing in the conductor or conductors of the cable. These cores and coils may be placed at any convenient location longitudinally of the cable or at a junction box.

The coil or winding of the core is capable of producing an electromotive force and may be connected in such a manner as to reduce or, if desired, to neutralize the effect of the electromotive force induced in any specified length of sheath.

Connections between the winding and the sheath may be made by connecting it across breaks in the continuity of the sheath or by connecting one end of the winding to a point on the sheath and the other end to ground.

As the electromotive force induced in the sheath or metallic cover is proportional to the current flowing in the conductor, or in multiple conductor cables proportional to the vector sum of the currents, and inasmuch as the electromotive force induced in the winding is also proportional to these currents, it is obvious that if they are adjusted to any ratio for a given current in the cable conductor, they will maintain that ratio for all conductor currents up to the saturation point of the core.

If the ratio of sheath electromotive force to coil electromotive force is one, there will be complete neutralization. If it be desired to have complete neutralization at all currents in the cable conductors, the magnetic core should be so proportioned as to operate below the saturation point. If, however, it is not desired to have complete neutralization at the heavier loads in the cable, the core may work beyond the saturation point.

It will be obvious from the detailed description to follow that several methods may be employed to obtain a balance between the sheath electromotive force and the electromotive force induced in the winding or coil. One method is to vary the number of turns in the coil. Another is to provide an air gap in the magnetic circuit, which can be adjusted until a balance is obtained. Another method is to vary the dimensions of the core itself; while still another method is to alter the position of the core and coil with respect to the cable.

In the accompanying drawings I have shown several embodiments of my invention:

Figure 1 shows one form or embodiment of the invention in which the core is in the form of an annulus or ring surrounding the cable;

Fig. 2 shows a construction similar to that of Fig. 1, but with a different method of grounding;

Fig. 3 shows a still further modification with a different form of grounding;

Fig. 4 shows a further modification in which the magnetic core is provided with an adjustable air gap;

Fig. 5 shows a still further modification;

Fig. 6 shows the application to a junction box of the principle shown in Fig. 5;

Fig. 7 shows an embodiment of my invention in which the conductor cable is provided with two metallic covers; and Fig. 8 shows a still further modification in which the magnetic core is entirely dispensed with.

Referring first of all to the embodiment of my invention as illustrated in Fig. 1, 1 designates a cable for conducting alternating or pulsating currents; this cable may be a single conductor cable or a multiple conductor cable, as the case may be. The cable is provided with a metallic cover 2, referred to hereinafter, for the sake of clarity, as a sheath, although it is to be clearly understood that this term is intended to include as well any conducting cover with which these cables may be provided. In other words, the expression "sheath" is intended to apply to one or more layers of conducting material applied to the insulation of conductor cables of both the single and multiple conductor type.

The continuity of the sheath 2 may be interrupted at different points along the length thereof as indicated at 3, 4 and 5, these sections of sheath being insulated from each other. This provides a series or plurality of lengths of sheath, 6, 7 and 8. Adjacent to break 3 I apply a core 9 disposed so as to be magnetized by the current in the cable conductors, this core in the form illustrated being an annulus of laminated magnetic material, such as iron or steel, for example, and surrounding the sheath.

Adjacent to the break 4 I provide a similar core member, designated 10, while adjacent the break 5 I provide a similar member 11. The actual position of these cores longitudinally on the cable is immaterial, provided no connections are made to the cable conductor or conductors, which will produce different currents in various parts of the cable. They are shown adjacent the breaks 3, 4 and 5 for simplicity and as being the most practicable position.

The core members 9, 10 and 11 are illustrated as similar in construction, each comprising a plurality of laminations 12 in the form of annuli. Each magnetic core is provided with a winding or coil 13, one end of which is connected to one section of the sheath, while the other end is connected to an adjacent section and so wound upon the core or connected to the sheath that the electromotive force induced therein will be opposed to the electromotive force induced in the sheath. Considering the sheath section 7, for example, it will be seen that one end of the coil or winding 13 provided on the member 9 is connected to this section 7, as indicated at 14, while the other end of this same winding is connected to the adjacent sheath section 6, as indicated at 15, the sections 6 and 7 both being grounded, as indicated at 16 and 17, respectively.

With this cable in operation, that is to say, with current passing therethrough, an electromotive force will be induced in the several sections of the sheath 2, this electromotive force being proportional to the current flowing in the conductor of the cable or in multiple conductor cables to the vector sum of the currents and to the length of each sheath section. It will be obvious also that an electromotive force will be induced in the several windings 13 proportional to the current flowing in the conductor of the cable or in multiple conductor cables to the vector sum of the current. Hence, it will be obvious that reduction in the currents induced in the sheath sections is obtained, and by proper design complete neutralization at all currents up to the saturation point of the magnetic ring can be obtained. I might say that this proper design can be accomplished in several ways, and in the present instance, that is to say, in the embodiment of Fig. 1, is obtained by the proper number of turns in the winding or coil 13 and the proper dimensioning of the magnetic ring or core, all of which will be clearly understood by anyone skilled in this art. I may state at this point that if the cable is of that type provided with an outer sheath of magnetic material, it is advisable to remove the outer sheath at the point where the core members are applied.

Each of the coils 13, as above explained, is connected across the break between the sheath sections, while the sheath sections are grounded, the coil or winding 13 on the core 9, for example, reducing or neutralizing the sheath current in that portion of the sheath lying between the grounds 16 and 17.

I wish it to be understood, however, that, if desired, the grounds illustrated in Fig. 1 as intermediate the ends of the cable may be dispensed with and only the two ends of the cable sheath grounded. The sum of the electromotive forces induced in the various coils will then be balanced against the whole length of sheath.

In Fig. 2 I have shown a construction which is identical with that above described, except for the grounding, and accordingly a detailed description of this embodiment of my invention is unnecessary except to say that the coils 13 in this instance are grounded as indicated at 20, instead of grounding the sections 6, 7 and 8 of the sheath.

In Fig. 3 I show a cable having sheath sections 7 and 8, magnetic cores 9 and 10, surrounding these sections, respectively, each core being provided with a winding 13, one end of the winding on the core 10 being connected to the sheath section 8 as indicated at 21, while one end of the winding 13 on the member 9 is connected to the sheath section 7, as indicated at 22. The other ends of these two coils are connected to ground as indicated at 23. The other ends of sections 7 and 8 may be grounded directly or through neutralizing coils, as shown.

In Fig. 4 I show the sheath divided at 3 into two sections, 6 and 7; around the cable I place a laminated core, which I will designate 10' and which corresponds to the cores 9, 10 and 11, for example. The core 10' is made up of laminations 28, which are pivoted at 29 to the main portion 30 of the core to provide an adjustable air gap 31 between the face of these laminations and the face of the laminations composing the main or body portion 30. The purpose of providing this air gap 31 is to provide an adjustment so that a balanced condition can be obtained without necessitating changing of the winding 13' with which this core is provided. The coil 13' is grounded as indicated at 32 and one end of the coil is connected to the sheath section 7 as indicated at 14', while the other end of the coil is connected to the sheath section 6 as indicated at 15'.

While I have shown the coil 13 grounded at 32, it is to be understood that this ground may be dispensed with and the cable sheath grounded as referred to in connection with my description of Fig. 1.

In Fig. 5 I show a laminated core member 10'' which, as in the case of the embodiment of the invention illustrated in Fig. 4, is provided with an adjustable air gap 31''. This core member 10'' is placed over the sheath of the cable, which as before is divided into sections 6, 7 and 8. As illustrated, the core 10'' is placed over the section 7, it being understood, of course, that similar core members may be applied in a similar fashion to other sections of the cable sheath. Here I do not provide the core 10'' with a coil such as the coils 13 above referred to, but I employ the sheath sections themselves for this purpose. In this connection, the sheath sections 7 and 8 are connected to each other by conductor 43, while the sections 6 and 7 are connected to each other by conductor 44; these two conductors when connected as just described forming with the sheath section 7 a one turn neutralizing coil. The section 8 is grounded at 45 while the section 6 is grounded at 46. The effect of this construction, or rather its operation, is in principle the same as that of the constructions already described.

In Fig. 6 I show, as above noted, my invention applied to a junction box. In this instance a cable 47 is connected to a cable 48, by a metallic joint box 49. The middle section of this joint box, that is to say, the section designated 50, is of non-magnetic material, and is bolted to, but electrically insulated from, the metallic ends of the joint box by insulation 51 and 52. Around the intermediate portion 50 of the joint box I apply a magnetic core member 53, this member being composed of laminations 54 and surrounding the section 50 of the joint box, but insulated therefrom by insulation 55. This member 53 can be adjusted, both as to length of the member and width of the air gap 56, as will be obvious from an inspection of the drawing. A conductor 57 has one end connected to the end of the joint box to which the cable 48 is connected, while its other end is connected to the intermediate portion 50 of the joint box. A conductor 58 has one end connected to the end of the joint box to which the cable 47 is connected, while its other end is connected to the intermediate portion 50 of the joint box. As so connected, these two conductors form with the section 50 of the joint box a one turn neutralizing coil.

In the embodiment of my invention as illustrated in Fig. 7 I show a cable provided with a sheath 60 and with an armor 61. In order that the effect of the electromotive forces induced in the sheaths 60 and armor 61 may be reduced or neutralized, I divide the cable sheath and the cable armor into sections similar to the sections into which the sheath of Fig. 1 is divided, and for neutralizing the electromotive force induced in the sheath 60 I provide a core 62 of magnetic material in inductive relation to the cable, this core being provided with a winding 63 which corresponds to the coils or windings 13, above referred to, one end of this coil or winding being connected to the sheath section 64 while the other end is connected to the sheath section 65. It will be understood, of course, that these two sections of the sheath are insulated from each other, as indicated at 66. These two sheath sections are grounded at 67 and 68. For neutralizing the electromotive force induced in the armor 61, I provide a core 69, which is similar to the core 62 and is provided with a winding 70, one end of which is connected to the armor section 71, the other end being connected to the other armor section 72. These two sections of the armor are grounded at 73 and 74, respectively.

In Fig. 8 I show a cable 75, which may be a single conductor or multiple conductor cable, the sheath of which is composed of sections, 76, 77, 78, 79, 80, 81, 82, etc., adjacent sections being insulated from each other, as indicated at 83. Attached to the section 76 is one end of a conductor 84, the other end thereof being connected to the end of the section 77 remote from the section 76. To the opposite end of this section 77 is connected a conductor 85, the other end of which is connected to the end of the sheath section 78 adjacent the section 77.

The end of the sheath section 78 adjacent the sheath section 79 is grounded, as indicated at 86, and to this ground and connected to the end of the sheath 79 remote from the section 78 is connected a conductor 87. Connected to the opposite end of this sheath section 79 is a conductor 88, the opposite end of which is connected to the end of the sheath section 80 adjacent the sheath section 79. The opposite end of this sheath section 80 is grounded, as indicated at 89, and to this ground is connected a conductor 90, the opposite end of which is connected to the end of the sheath section 81 remote from the sheath section 80. A conductor 91 has one end connected to the end of the sheath section 81 adjacent the sheath section 80, while the opposite end is connected to the sheath section 82 adjacent sheath section 81. It will be seen, therefore, that adjacent pairs of discontinuous lengths of sheath sections are connected together in opposition.

With this construction the flow of sheath current will be reduced and even neutralized, if desired, provided, of course, that the lengths of the sections connected in pairs are properly balanced against each other. To make this arrangement practicable, the longitudinal portions of the connections connecting the sheath sections must be placed some distance from or magnetically shielded from the magnetic effect of the current in the conductor or conductors of the cable.

From all of the foregoing it will be seen that I have provided a method and apparatus adapted for use in connection with conductor cables, either of the single conductor or multiple conductor type, as the case may be, in which the so-called sheath currents are reduced or, if desired, may be completely neutralized, thereby eliminating, or reducing to a point or degree where no longer detrimental, the setting up of dangerous potentials in the sheath of the cable, and also undue heating.

As I have pointed out above, the term "sheath" as used herein is to be interpreted to mean any metallic cover for a conductor cable. There may be but one of these sheaths, as in the case of certain types of conductor cables, where a lead sheath is employed, which it will be understood is insulated from the conductor or conductors of the cable, while in other cases, in addition to this lead sheath, a so-called armor or armor covering is employed, usually of magnetizable material, and insulated from the lead sheath, if one be employed, but in any event insulated from the conductor or conductors of the cable.

It will be seen also that I have provided means for reducing or neutralizing sheath currents in which the apparatus employed may be installed at any convenient location with respect to the length of the cable, or at the joint or junction boxes by which two lengths of cable are connected together.

I wish it to be understood, furthermore, that while I have illustrated and described reducing or neutralizing means in which I have employed an annulus of magnetizable material laminated, my neutralizing or reducing means may take other forms, if desired, provided the same is magnetizable by the current or currents flowing in the conductor or conductors of the cable.

What I claim is:

1. In combination, a conductor cable, a sheath or conducting covering therefor in discontinuous lengths, a core of magnetizable material applied about said cable and having an adjustable air gap and a winding for said core, the ends of said windings being connected to adjacent lengths of the sheath.

2. In combination, a conductor cable, a sheath therefor in discontinuous lengths insulated from each other, a core composed of laminated magnetic material, certain of said laminæ being movable relative to the laminæ composing the remainder of the core to provide an adjustable air gap, and a winding for said core connected to adjacent sheath lengths.

This specification signed this 7th day of April, 1927.

FRANCIS J. WHITE.